United States Patent
Collins

(10) Patent No.: US 6,939,832 B2
(45) Date of Patent: Sep. 6, 2005

(54) PROCESS FOR TREATING AN OIL WELL

(75) Inventor: Ian Ralph Collins, Sunbury on Thames (GB)

(73) Assignee: BP Exploration Operating Company Limited, London (GB)

( * ) Notice: Subject to any disclaimer, the term of this patent is extended or adjusted under 35 U.S.C. 154(b) by 202 days.

(21) Appl. No.: 10/175,896

(22) Filed: Jun. 21, 2002

(65) Prior Publication Data

US 2003/0069143 A1 Apr. 10, 2003

Related U.S. Application Data

(63) Continuation of application No. PCT/GB00/04294, filed on Nov. 9, 2000.

(30) Foreign Application Priority Data

Dec. 21, 1999 (GB) .............................. 9930219

(51) Int. Cl.$^7$ ............................. C09K 3/00; E21B 43/27
(52) U.S. Cl. ...................... 507/225; 507/220; 507/229; 507/239; 507/252; 507/261; 507/921; 166/300; 166/305.1
(58) Field of Search ................................ 507/225, 220, 507/229, 239, 252, 261, 921; 166/300, 305.1

(56) References Cited

U.S. PATENT DOCUMENTS

| | | | | | |
|---|---|---|---|---|---|
| 2,681,889 | A | * | 6/1954 | Menaul et al. .............. | 166/307 |
| 2,742,426 | A | * | 4/1956 | Brainerd, Jr. ............... | 507/218 |
| 2,779,734 | A | * | 1/1957 | Buchanan et al. .......... | 507/244 |
| 2,801,218 | A | * | 7/1957 | Menaul ....................... | 507/201 |
| 3,403,522 | A | * | 10/1968 | Henry ......................... | 62/633 |
| 4,359,391 | A | * | 11/1982 | Salathiel et al. ............ | 507/277 |
| 4,517,102 | A | * | 5/1985 | Salathiel ..................... | 507/238 |
| 5,076,364 | A | * | 12/1991 | Hale et al. .................. | 166/310 |
| 5,905,061 | A | * | 5/1999 | Patel .......................... | 507/129 |
| 6,165,945 | A | * | 12/2000 | Halliday et al. ............ | 507/139 |
| 6,281,172 | B1 | * | 8/2001 | Warren et al. .............. | 507/110 |
| 6,331,508 | B1 | * | 12/2001 | Pakulski ...................... | 507/90 |
| 6,355,600 | B1 | * | 3/2002 | Norfleet et al. ............. | 507/120 |
| 6,608,006 | B2 | * | 8/2003 | Taylor et al. ............... | 507/131 |

* cited by examiner

Primary Examiner—Philip C. Tucker
(74) Attorney, Agent, or Firm—Nixon & Vanderhye

(57) ABSTRACT

Method of treating a subterranean formation, comprising (A) injecting down a well bore into the formation an admixture of (a) an emulsion having an internal aqueous phase comprising a water-soluble oil of gas field chemical or an aqueous dispersion of a water-dispersible oil or gas field chemical and an external oil phase comprising a liquid hydrocarbon and an oil-soluble surfactant and (b) a demulsifier comprising a solution of a surfactant having a cloud point temperature of above 40° C. Alternatively, the method comprises separately injecting down a well bore into the formation emulsion (a) and demulsifier (b) and generating an admixture of emulsion (a) and demulsifier (b) within the formation.

17 Claims, 2 Drawing Sheets

Differential pressure arising from the scale inhibitor injection stages of corefloods 1 and 2

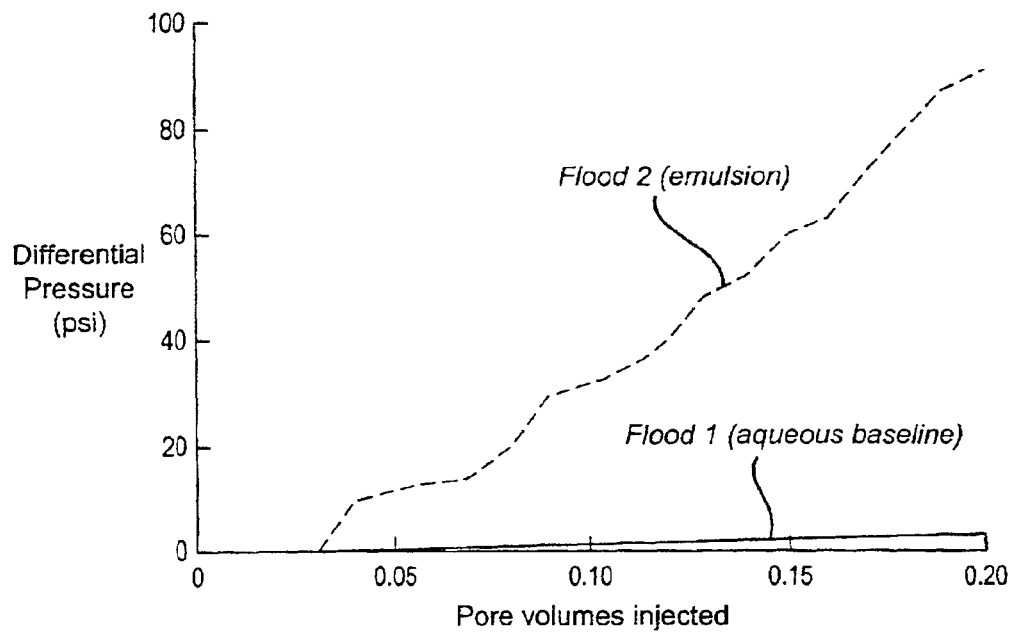
Fig. 1 Differential pressure arising from the scale inhibitor injection stages of corefloods 1 and 2
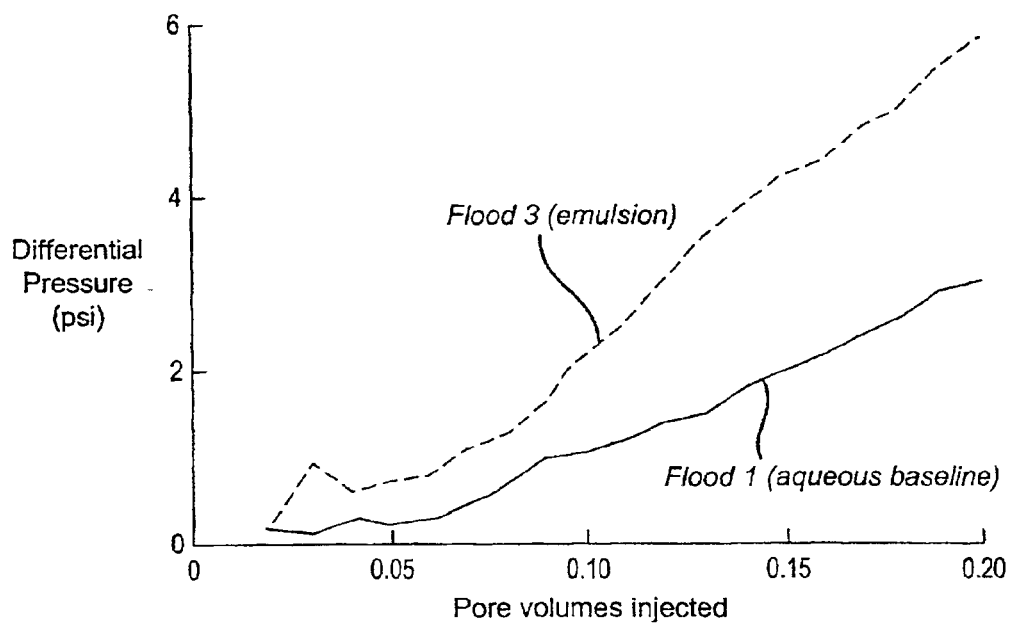
Fig. 2 Differential pressure arising from the scale inhibitor injection stages of corefloods 1 and 3

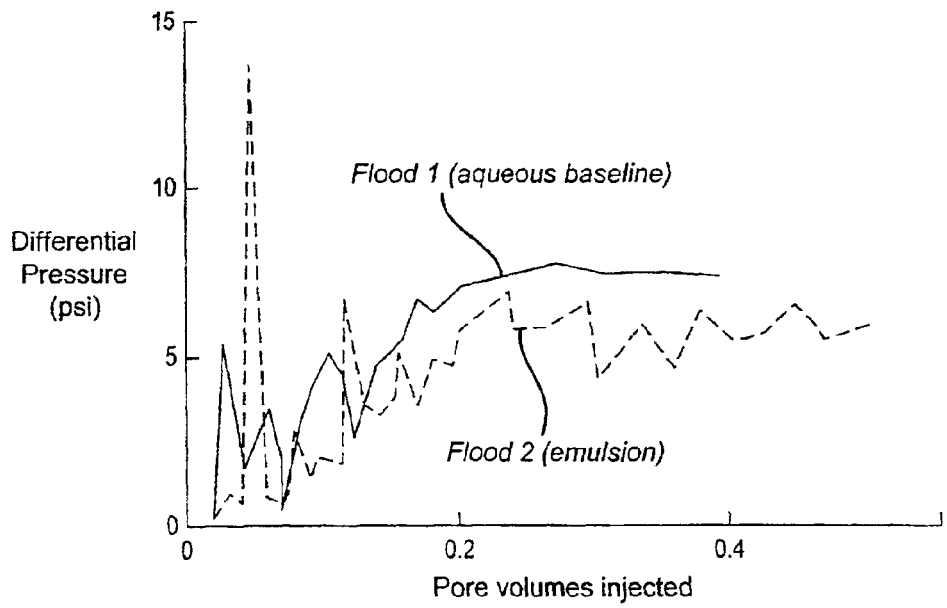
Fig. 3 Differential pressure recorded during oil back flush after injection and shut-in of the cores
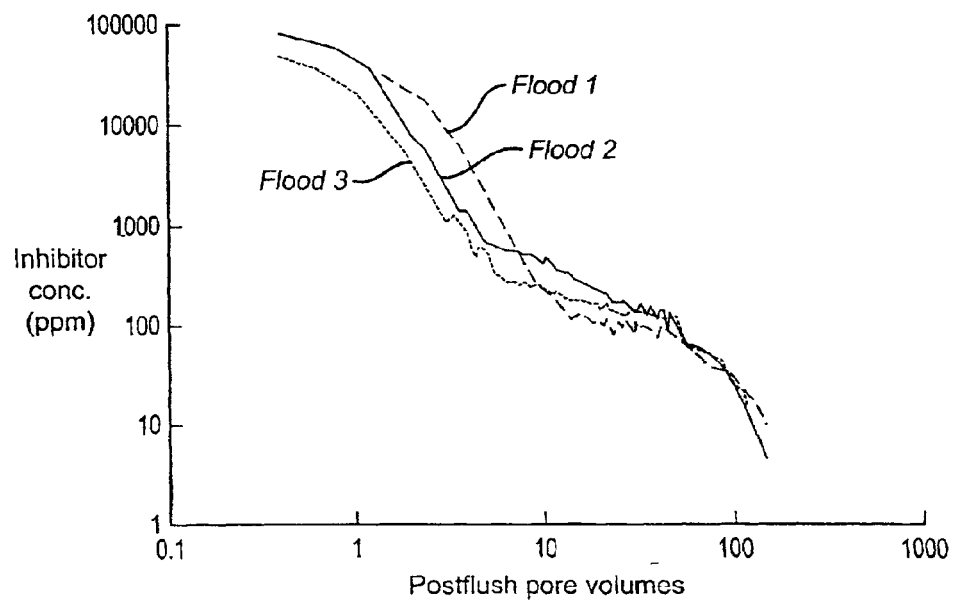
Fig. 4 Scale inhibitor elution profiles during the seawater postflush stage of the corefloods

PROCESS FOR TREATING AN OIL WELL

This application is a continuation of PCT/GB00/04294 filed on Nov. 9, 2000.

The present invention relates to a method for inhibiting deleterious processes in a well such as an oil well, particularly, but not exclusively, for inhibiting scale deposition.

BACKGROUND OF THE INVENTION

U.S. Pat. No. 4,517,102 teaches that generally, emulsions may be broken by adding demulsifiers to the pre-existing emulsions. The demulsifiers act with the surfactants (which induce emulsification and encapsulation) to cause an inversion and separation of the emulsion phase. It is stated that, unfortunately, adding demulsifiers to injected emulsions is impossible. When the fluids are not being pumped, mixing is limited to the interface. Pumping would require further displacement of the emulsion within the formation. Thus, stepwise injection of an emulsion and a demulsifier is not deemed feasible. U.S. Pat. No. 4,517,102 is silent concerning simultaneous injection of an admixture of an emulsion and a demulsifier. However, the skilled person would be concerned that addition of a demulsifier to an emulsion may cause an inversion and separation of the emulsion phase before the emulsion can be injected down the wellbore. Also, the skilled person would anticipate that on-the-fly mixing of the emulsion and demulsifier may cause premature inversion of the emulsion phase in the well bore before the emulsion phase can enter the formation. According to U.S. Pat. No. 4,517,102, in well treatment operations, several alternative schemes are used. In one system the emulsion surfactant is selected so that it will prefer to wet the surface of the formation rock. In this way, as the emulsion passes into the formation, the surfactant is removed from the emulsion in a sufficient amount to cause separation. In a second system, a mixture of surfactants is selected so that the emulsion will become unstable above a certain temperature. As the fluid temperature rises toward the formation temperature, the emulsion breaks. In a third system, the emulsion may be broken mechanically. The emulsion droplets break when they are squeezed into pores within the formation.

SUMMARY OF THE INVENTION

It has now been found that contrary to the teachings of U.S. Pat. No. 4,517,102 that stepwise injection of an emulsion and a demulsifier is feasible. It has further been found that it is possible to inject an admixture of a water-in-oil emulsion and a demulsifier into a formation without the emulsion breaking prematurely either prior to being injected into the wellbore or within the well bore.

Thus, according to the present invention there is provided a method of treating a subterranean formation, the method comprising:

(A) injecting down a well bore into the formation an admixture of (a) an emulsion having an internal aqueous phase comprising an aqueous solution of a water-soluble oil or gas field chemical or an aqueous dispersion of a water-dispersible oil or gas field chemical and an external oil phase comprising a liquid hydrocarbon and an oil-soluble surfactant and (b) a demulsifier comprising a solution of a surfactant having a cloud point temperature of above 40° C.; or (B) separately injecting down a well bore into the formation emulsion (a) and demulsifier (b) and generating an admixture of emulsion (a) and demulsifier (b) within the formation.

The demulsifier acts by breaking down the emulsion within the formation (by inversion) to release the oil or gas field chemical into contact with the surfaces of the pores of the formation. For example, where the aqueous phase of the emulsion contains a scale inhibitor, the inhibitor will adsorb or precipitate onto the surfaces of the pores of the formation, while the oil phase will remain in continuity with any hydrocarbon, for example, oil present in adjacent pores so that subsequent flow of hydrocarbon through the formation is not suppressed.

An advantage of the process of the present invention is that the emulsion breaks more cleanly in the presence of the demulsifier than when relying on the inherent properties of the emulsion and the temperature, time, or mechanical stresses to which it is subjected to separate the phases.

The emulsion employed in the present invention may be made in a basic three step approach. The first step is to form either (i) an aqueous solution of a suitable water-soluble oil or gas field chemical or (ii) an aqueous dispersion of a suitable water-dispersible oil or gas field chemical.

The water which is used to form the aqueous solution or dispersion may be pure water, tap water, deionised water, seawater, sulphate reduced seawater or a synthetic brine. It will be appreciated that the aqueous solution or dispersion may also include liquids other than water, for example alcohols, as long as they are not soluble in the oil phase.

Suitable water-soluble or water-dispersible oil or gas field chemicals may be (i) scale inhibitors, (ii) corrosion inhibitors, (iii) inhibitors of asphaltene deposition, (iv) hydrogen sulphide scavengers or (v) hydrate inhibitors.

Scale inhibitors include water-soluble organic molecules having at least 2 carboxylic and/or phosphonic acid and/or sulphonic acid groups e.g. 2–30 such groups. Preferred scale inhibitors are oligomers or polymers, or may be monomers with at least one hydroxyl group and/or amino nitrogen atom, especially in hydroxycarboxylic acids or hydroxy or aminophosphonic, or, sulphonic acids. Scale inhibitors are used primarily for inhibiting calcium and/or barium scale. Examples of such compounds used as scale inhibitors are aliphatic phosphonic acids having 2–50 carbons, such as hydroxyethyl diphosphonic acid, and aminoalkyl phosphonic acids, e.g. polyaminomethylene phosphonates with 2–10 N atoms e.g. each bearing at least one methylene phosphonic acid group; examples of the latter are ethylenediamine tetra(methylene phosphonate), diethylenetriamine penta (methylene phosphonate) and the triamine- and tetramine-polymethylene phosphonates with 2–4 methylene groups between each N atom, at least 2 of the numbers of methylene groups in each phosphonate being different (e.g. as described further in published EP-A-479462, the disclosure of which is herein incorporated by reference). Other scale inhibitors are polycarboxylic acids such as acrylic, maleic, lactic or tartaric acids, and polymeric anionic compounds such as polyvinyl sulphonic acid and poly(meth)acrylic acids, optionally with at least some phosphonyl or phosphinyl groups as in phosphinyl polyacrylates. The scale inhibitors are suitably at least partly in the form of their alkali metal salts e.g. sodium salts.

Examples of corrosion inhibitors are compounds for inhibiting corrosion on steel, especially under anaerobic conditions, and may especially be film formers capable of being deposited as a film on a metal surface e.g. a steel surface such as a pipeline wall. Such compounds may be non-quaternised long aliphatic chain hydrocarbyl N-heterocyclic compounds, where the aliphatic hydrocarbyl group may be as defined for the hydrophobic group above; mono- or di-ethylenically unsaturated aliphatic groups e.g.

of 8–24 carbons such as oleyl are preferred. The N-heterocyclic group can have 1–3 ring nitrogen atoms with 5–7 ring atoms in each ring; imidazole and imidazoline rings are preferred. The ring may also have an aminoalkyl e.g. 2-aminoethyl or hydroxyalkyl e.g. 2-hydroxyethyl substituent. Oleyl imidazoline may be used. Where corrosion inhibitors are released into the formation using the method of the present invention, these inhibitors are effective in reducing corrosion of metal surfaces as they are produced out of the well.

Asphaltene inhibitors include amphoteric fatty acid or a salt of an alkyl succinate while the wax inhibitor may be a polymer such as an olefin polymer e.g. polyethylene or a copolymeric ester, e.g. ethylene-vinyl acetate copolymer, and the wax dispersant may be a polyamide.

Hydrogen sulphide scavengers include oxidants, such as inorganic peroxides, e.g. sodium peroxide, or chlorine dioxide, or aldehydes e.g. of 1–10 carbons such as formaldehyde or glutaraidehyde or (meth)acrolein.

Hydrate inhibitors include salts of the formula $[R^1(R^2)XR^3]^+Y^-$, wherein each of $R^1$, $R^2$ and $R^3$ is bonded directly to X, each of $R^1$ and $R^2$, which may the same or different is an alkyl group of at least 4 carbons, X is S, $NR^4$ or $PR^4$, wherein each of $R^3$ and $R^4$, which may be the same or different, represents hydrogen or an organic group with the proviso that at least one of $R^3$ and $R^4$ is an organic group of at least 4 carbons and Y is an anion. These salts may be used in combination with a corrosion inhibitor and optionally a water soluble polymer of a polar ethylenically unsaturated compound. Preferably, the polymer is a homopolymer or a copolymer of an ethylenically unsaturated N-heterocyclic carbonyl compound, for example, a homopolymer or copolymer of N-vinyl-omega caprolactam. Such hydrate inhibitors are disclosed in EP 0770169 and WO 96/29501 which are herein incorporated by reference.

Preferably, the oil or gas field chemical may be dissolved or dispersed in the internal aqueous phase of the emulsion in an amount in the range of from 1 to 50 percent by weight, preferably 5 to 30 percent by weight.

The second step is to blend a suitable liquid hydrocarbon with a suitable oil-soluable surfactant. The liquid hydrocarbon selected may be a crude oil or a refined petroleum fraction such as diesel oil, gas condensate, gas oil, kerosene, gasoline and the like, or may be a biodiesel. Particular hydrocarbons such as benzene, toluene, ethyl-benzene, cyclohexane, hexane, decane, hexadecane, long chains alcohols (e.g. C10), and the like may also be used. Preferably, the liquid hydrocarbon is kerosene or a base oil (a refined hydrocarbon)

The oil-soluble surfactant must have a hydrophilic/lipophilic balance (HLB) suited to the other liquids present in the emulsion. Preferably, the oil-soluble surfactant has an HLB value of less than 8, preferably less than 6, more preferably in the range 4 to 6. Examples of suitable surfactants include sorbitan monooleate, sorbitan monostearate, sorbitan trioleate, sorbitan monopalmitate, sorbitan tristearate, non-ionic block co-polymers, polyoxyethylene stearyl alcohols, polyoxyethylene cocoa amines, fatty amine ethoxylates, polyoxyethylene oleyl alcohols, polyoxyethylene stearyl alcohols, polyoxyethylene cetyl alcohols, fatty acid polyglycol esters, glyceryl stearate, glyceryl oleate, propylene glycol stearate, polyoxyethylene oleates, polyoxyethylene stearates, and diethylene glycol stearate. More than one oil-soluble surfactant may be employed.

Typically, minor amounts of oil-soluble surfactant are blended with the liquid hydrocarbon. The concentration of oil-soluble surfactant in the blend of oil-soluble surfactant and liquid hydrocarbon may be in the range of from 0.1 to 6 percent by weight, preferably 0.2 to 2 percent by weight.

It will be appreciated that the order of the first and second steps may be reversed or the first and second steps may be performed simultaneously.

The third step is to form the emulsion, which is preferably accomplished by slowly pouring the aqueous solution or dispersion into the blend of the liquid hydrocarbon/oil-soluble surfactant while intensive blending is applied. The blending operation for the emulsion should be designed to minimise the size of the internal phase water droplets since this may increase the stability of the emulsion. Small aqueous droplets can be prepared by thoroughly emulsifying the aqueous and hydrocarbon phases. Preferably, emulsification is accomplished by slowly pouring the aqueous solution or dispersion into the blend of liquid hydrocarbon/oil-soluble surfactant while intensive blending is applied. The mixture should be vigorously stirred or sheared for about 5 to 20 minutes, the rate of shear being highly dependent on the size and type of mixing device employed. In oil or gas field operations, mechanical mixing equipment or blenders may be used to impart the desired shear to the mixture. Stirring rate and times should be designed to form small aqueous droplets having average diameters of from about 0.01 to about 100 microns and preferably from about 0.1 to about 10 microns.

Preferably, the internal aqueous phase of the emulsion should amount to from 10 to 70 percent, more preferably from 30 to 60 percent of the total volume of the emulsion.

Density control of the emulsion may be used to enhance the stability of the emulsion (measured in the absence of the demulsifier). This may be accomplished by addition of weighting agents to the internal aqueous phase of the emulsion. For example, minor amounts of soluble salts such as sodium or potassium chloride may be added to the internal aqueous phase. Suitably, the aqueous phase may comprise from 0.5 to 20 percent by weight of soluble salts. Preferably, the emulsion is stable, in the absence of the demulsifier, at the most extreme conditions of temperature and pressure existing in the well bore and/or the formation.

Suitably, the demulsifier comprises a solution of a surfactant having a cloud point temperature of at least 40° C., preferably at least 50° C., more preferably at least 60° C. The cloud point temperature of a surfactant is defined as the temperature at which an aqueous solution of the surfactant becomes cloudy as the surfactant comes out of the solution. Without wishing to be bound by any theory, it is believed that, as the surfactant of the demulsifier comes out of solution, the surfactant will travel to the interface of the emulsion thereby assisting in the breakdown of the emulsion. The cloud point temperature therefore provides an indication of the temperature at which the demulsifier will be expected to break the emulsion. The cloud point temperature is dependent upon both the nature of the surfactant and its concentration. It will be appreciated that the temperature in the region of the formation into which the admixture of the demulsifier and the emulsion is to be injected or in which the admixture is to be generated will be different for different wells, and so breakdown of the emulsion has to be suited to that well. For example, in one well it may be desirable for the emulsion to break down at a temperature of 115° C., while in another well the breakdown temperature might be 130° C. or 75° C. The demulsifier should therefore comprise a surfactant selected to suit the particular well at a concentration which allows breakage of the emulsion at the optimum temperature for that well. Preferably, the demulsifier comprises a surfactant at a concentration such that the demulsifier has a cloud point temperature of at least 15° C. less, preferably at least 30° C. less, more preferably at least 50° C. less than the formation temperature. Preferably, the demulsifier comprises more than one surfactant.

Suitably the demulsifier comprises at least one surfactant selected from the group consisting of:

(a) polyamine salts such as polyester amines, amino methylated poly acrylamide, poly di-methyl amino propyl methacrylamide, poly dimethyl amino ethyl acrylate, poly ethylene imine, poly vinyl pyrrolidone, caprolactam-based polymers and quaternised versions of the above. Suitably, the molecular weight of the polyamine salt is above 3000;

(b) multifunctional polyethers such as sulfated triglycerides;

(c) polyethers, such as copolymers of ethylene oxide and propylene oxide and the reaction products of such copolymers with diacids, diepoxides, diisocyanates, aldehydes, and diamines. Suitably, the molecular weight of the polyether is above 2000; and (d) p-alkylphenol-formaldehyde resins and ethylene oxide and/or propylene oxide derivatives thereof.

Suitably, the demulsifier comprises a solution of the surfactant(s) dissolved in an aqueous or organic solvent such as monoethylene glycol (MEG), tetraethylene glycol (TEG), butylethylene glycol (BGE), butyldiethylene glycol (BDGE), water, xylene and toluene. Typically, the demulsifier contains minor amounts of surfactant(s) since the use of excessive quantities of surfactant(s) may prematurely result in destruction of the emulsion by inversion. Preferably, the concentration of surfactant(s) in the demulsifier is generally in the range of from 0.01 to 5 percent by weight, preferably 0.1 to 2 percent by weight, for example, 0.2 to 1 percent by weight. As discussed above, the cloud point of a surfactant is concentration dependent. Thus, the temperature at which the emulsion breaks can be precisely controlled by adjusting the concentration of surfactant(s) in the demulsifier.

The admixture of emulsion and demulsifier may be generated within the formation by injecting the emulsion into the well bore prior to the injection of the demulsifier. This ensures that the emulsion will be uncontaminated by any of the demulsifier during injection down the well bore. However, it is envisaged that by appropriate selection of the surfactant(s) of the demulsifier and of the concentration of the surfactant(s), the demulsifier may be injected down the well bore prior to injection of the emulsion without premature breaking of the emulsion in the well bore.

If desired, a spacer may be employed between the emulsion and demulsifier to ensure that mixing does not take place before the emulsion and demulsifier enter the formation. Suitably, the spacer may be aqueous (for example, pure water, tap water, deionised water, seawater, sulphate reduced seawater, production water or a synthetic brine, such as a KCl brine) or a liquid hydrocarbon (for example, a glycol ether such as butyl glycol ether, butyl diglycol ether and ethylene glycol monobutyl ether, or crude oil, or a refined petroleum fraction such as kerosene, diesel and base oil or a biodiesel).

Where the emulsion is injected into the well bore prior to injection of the demulsifier, the emulsion will enter the formation before the demulsifier. Without wishing to be bound by any theory, the demulsifier is less viscous than the emulsion and will have a higher velocity than the emulsion within the formation. Accordingly, the demulsifier will overtake the emulsion in the formation leading to in situ generation of an admixture of the emulsion and demulsifier.

Where the demulsifier is injected into the well bore prior to injection of the emulsion, the demulsifier will enter the formation before the emulsion. Without wishing to be bound by any theory, the difference in the velocities of the emulsion and demulsifier within the formation will result in the demulsifier being back produced over the emulsion (when the well is put back into production) thereby generating an admixture of the emulsion and demulsifier.

It is preferred to inject an admixture of the emulsion and demulsifier down the well bore. Thus, in a preferred embodiment of the present invention there is provided a method of treating a subterranean formation, the method comprising the steps of:

A) preparing an admixture of (a) an emulsion having an internal aqueous phase comprising an aqueous solution of a water-soluble oil or gas field chemical or an aqueous dispersion of a water-dispersible oil or gas field chemical and an external oil B) phase comprising a liquid hydrocarbon and an oil-soluble surfactant and (b) a demulsifier comprising a solution of a surfactant having a cloud point temperature of above 40° C.; and C) injecting the admixture down a well bore into the formation.

Preferably, the admixture is injected down the well bore at a rate such that the residence time of the admixture of emulsion and demulsifier in the well bore is less than the breakage time of the emulsion under the conditions within the wellbore.

By "breakage time" is meant the time taken for demulsifier to cause inversion of the emulsion at the most extreme conditions of temperature and pressure within the wellbore, for example, the conditions at the bottom of the wellbore.

Where an admixture of the emulsion and demulsifier is to be injected into the well bore, the temperature in the well bore and formation should be modeled so that a demulsifier may be selected having at least one surfactant chosen to suit the conditions in the well bore and formation at a concentration chosen so as to avoid premature breakage of the emulsion in the well bore and to allow breakage of the emulsion in the formation at a targeted radial distance from the well bore. In particular, the demulsifier should comprise a surfactant having a cloud point temperature, at the chosen concentration of surfactant, which is substantially above ambient temperature so as to mitigate the risk of the emulsion breaking as the demulsifier is admixed with the emulsion.

It is envisaged that the admixture of the emulsion and demulsifier may be prepared by on-the-fly mixing of the emulsion and demulsifier. Alternatively, the admixture may be prepared using surface mixing equipment. The time interval between preparation of the admixture, using the surface mixing equipment, and injection of the admixture down the wellbore is typically less than 12 hours, preferably less than 5 hours, more preferably less than 1 hour and most preferably less than 0.5 hours. Generally, the admixture will be injected down the wellbore immediately after its preparation using the surface mixing equipment The invention will now be illustrated by the following examples and by reference to FIGS. 1 to 4.

BRIEF DESCRIPTION OF THE DRAWINGS

FIG. 1 shows the differential pressure arising from the scale inhibitor injection stages of corefloods 1 and 2.

FIG. 2 shows the differential pressure arising from the scale inhibitor injection stages of corefloods 1 and 3.

FIG. 3 shows the differential pressure recorded during oil back flush after injection and shut-in of the cores.

FIG. 4 shows the scale inhibitor elution profiles during the seawater postflush stage of the corefloods.

DETAILED DESCRIPTION OF THE PREFERRED EMBODIMENTS

Emulsions

The formulations of Emulsions A to C together with details of their preparation are provided in Table 1.

Aqueous Solution of Scale Inhibitor

The aqueous solution of scale inhibitor used in the Comparative test comprised 10 wt % DETAPMH [diethylenetriamine(pentamethylene) phosphonic acid].

Droplet Size Distributions.

Droplet size distributions of Emulsions A to C were determined using a Galai Computerised Inspection System, CIS-1. Prior to analysis, the emulsions were diluted either in cyclohexane or kerosene (1–2 drops of emulsion in approximately 5 ml diluent). The median diameters of the droplets of the aqueous phase are given in Table 2 below.

Stability-Temperature Determinations.

The stability of Emulsions A to C was assessed mainly by visual observation. Some limited periodic determinations of droplet size were also carried out. The formulations were designed to be stable towards coalescence and bulk phase separation under ambient conditions, although some creaming and sedimentation with time is inevitable. In addition to the ambient temperature observations, aliquots (10–20 ml) of the emulsions were also incubated in tightly-stoppered vials at 80, 100 and (when necessary) 120° C. for visual observation of stability. In this way, phase separation and the formation of any middle phases were evaluated qualitatively as a function of time. Stability-temperature data for the emulsions are given in Table 2 below.

Rheological Determinations.

The rheology of Emulsions A to C was examined in order to determine whether the emulsions could be pumped downhole under "worst case" conditions at the oil or gas field production site. The C25 measuring system of a Bohlin VOR rheometer was used to measure apparent viscosity as a function of shear rate at 5° C., chosen as a typical ambient temperature. The data is provided in Table 2 below. The measured apparent viscosities would allow the emulsions to be deployed downhole under typical field conditions.

Coreflood Experiments

Core flooding experiments were used to compare the performance of admixtures of Emulsion C and demulsifier (Floods 2 and 3) with the solution of scale inhibitor in seawater (Flood 1). The performance of the scale inhibitor formulations was evaluated by comparing the generated inhibitor desorption profiles and also by any permeability or saturation changes apparent after the injection of the formulations. Berea outcrop rock was used for the core material. The liquid phases comprised a refined oil (Isopar H) and a standard brine (synthetic seawater prepared in the laboratory; filtered using 0.45 micron membrane before use). The test sequence was as follows:

A core plug was saturated with the brine, and the pore volume was determined. The core plug was then equilibrated to the test temperature (100° C.). The absolute permeability of the core plug to the brine ($K_{abs}$), the relative permeabilities of the core plug to brine and oil together with the end state saturation levels of the core plug were measured. With the core plug at residual brine saturation, the core plug was cooled to the injection temperature (60° C.). 8 pore volumes of scale inhibitor formulation (admixtures of Emulsion C with 4.7g of Baker Petrolite ML 3407 demulsifier per 100 g of emulsion; or the aqueous solution of scale inhibitor) was then injected. In each case, the injected scale inhibitor formulation contained 10 wt % scale inhibitor in the aqueous phase.

The core plug was shut in and the temperature raised to 100° C. The core plug was then backflushed with oil, and, the permeability of the core plug to oil was measured (once steady-state conditions were attained). The residual brine saturation was then calculated and the inhibitor content of the eluted brine analysed. The core plug was then back-flushed with brine (seawater), and an inhibitor desorption profile was determined. The permeability of the core plug to brine was also determined. The core plug was then flushed with oil to attain the residual brine saturation, and the permeability of the core plug to oil was re-measured. Permeabilities were calculated from a linear regression of at least 4 pressure drop/fluid flow rate data pairs.

The results of these tests are summarized in Table 2. The results show that there was little difference between the tests which employed the admixtures of Emulsion C and demulsifier and the test which employed the aqueous solution of scale inhibitor in terms of fluid saturations or return permeabilities. Both systems tended to increase the core plug residual oil saturation (by slightly more in the case of the admixtures of Emulsions C and demulsifier), resulting in a reduced brine permeability at $S_{or}$ (residual oil saturation) in all cases. The reduction in $S_{wi}$ (initial water saturation) caused by the inhibitor formulations resulted in a slightly increased oil permeability in the case of the aqueous solution of scale inhibitor (Flood 1), whereas a small decrease in oil permeability was observed after the treatment with the admixtures of Emulsion C and demulsifier (Floods 2 and 3). This may be due to some unbroken emulsion remaining in the core; emulsion was eluted during the oil back flush and the pressure drop profile exhibited spikes (see FIG. 3) which may have coincided with the displacement of the higher viscosity emulsion from the core plug.

FIG. 1 compares the injection pressures observed in Floods 1 and 2, from which it can be seen that the injection pressure of the admixture of emulsion C and demulsifier is much greater than would be expected from the viscosity difference between Emulsion C and the aqueous solution of scale inhibitor (12cP compared with 0.82cP). Examination of Emulsion C under a microscope (prior to injection) indicated a droplet size of approximately 5 μm, which falls into the region where bridging of the Berea rock pore throats may be expected. A build up of droplets at the inlet end of the core may explain the high pressure observed. However, the inhibitor is known to have entered the core plug from the measured fluid saturations, and also because a good desorption profile was obtained. Therefore, without wishing to be bound by any theory, either the droplets deform to permit entry into the pores, or they break under the pressure build up and the system is no longer fully emulsified as it penetrates the rock. Emulsion C used in Flood 3 underwent additional mixing which gave an approximate droplet size of 1–2 μm. The resultant injection pressure is shown in FIG. 2 together with that of the aqueous solution of the scale inhibitor for comparison (Flood 1), and it can be seen that a much lower pressure drop was generated by the admixture of Emulsion C and demulsifier of Flood 3 than in Flood 2. Reference to the viscosity and relative permeability differences between the admixtures of Emulsion C and the aqueous scale inhibitor solution can account for the observed pressure difference. All the data therefore indicate that formulations comprising admixtures of Emulsion C and demulsifier remain emulsified during injection.

The pressure required to instigate flow after the inhibitor shut-in is indicative of the drawdown needed to bring a well back onto production after a squeeze treatment. FIG. 3 shows the pressure recorded during the oil back flush in Floods 1 and 2, from which it can be seen that a lower pressure was observed after the treatment with the admixture of Emulsion C and demulsifier.

The inhibitor desorption profiles are shown in FIG. 4 for the sandstone tests. The data indicate that for the core floods which employed the admixture of Emulsion C and demulsifier (Floods 2 and 3) the scale inhibitor is eluted from the core plug slightly faster than in the experiment which used the aqueous DETAPMP solution (Flood 1). Without wishing to be bound by any theory, this could be due to the surfactants in the emulsion promoting oil-wetting of the rock and hence reducing inhibitor adsorption, or the emulsion may not contact as much of the rock as the test using the aqueous solution of scale inhibitor. The inhibitor concentration in the brine phase is such that the rock will be saturated if it contacts the injected slug, and furthermore, the inhibitor solution in the emulsion is twice as concentrated as the aqueous solution of scale inhibitor, which would promote adsorption if the equilibrium concentration is below the saturation value. It is believed that dispersion during injection and diffusion during shut in occurs less readily with the higher viscosity and reduced brine volume of the admixture of Emulsion C and demulsifier compared to the aqueous solution of scale inhibitor. However, in the field situation, when production restarts after an emulsion treatment the inhibitor will be able to adsorb on the rock between the treatment placement depth and the well bore, since that part of the formation will be separated from the inhibitor by the emulsions' external oil phase during injection. This could reduce the high initial returns typically observed with squeeze treatments, and extend the squeeze lifetime.

TABLE 1

Compositional details and mixing conditions of the emulsion formulations

| Emulsion | Inhibitor | Vol % kerosene | Wt % surfactant | Mixing conditions |
|---|---|---|---|---|
| A | copolymer of vinyl sulfonate and acrylic acid (ex Baker Petrolite; ML 3263) | 52.4 | 0.65% sorbitan monooleate | High shear mixing at 15,000 rpm, 30 s |
| B | copolymer of vinyl sulfonate and acrylic acid (ex Baker Petrolite; ML 3263) | 52.5 | 0.61% Hypermer B246 (ex ICI) | High shear mixing at 15,000 rpm, 30 s |
| C | DETAPMP neutralised to pH 2.3 | 47.2 | 1.13 % Hypermer B246 | Aqueous phase added to kerosene phase over 30 s with high shear mixing at 5,000 rpm followed by high shear mixing at 20,000 rpm, 60 s |

* containing 10 vol % scale inhibitor in the aqueous phase

TABLE 2

Physical characteristics of the emulsions

| Emulsion | Median diameter ($\mu$m)[a] | Viscosity (mPas) at 5° C./1 s$^{-1}$ | Stability[b] at (° C.) 80 | 100 | 120 |
|---|---|---|---|---|---|
| A | 7.2 | 210 | S | U | — |
| B | 4.9 | 120 | S | U | — |
| C | 1.0–5.0 | 110 | S | U | — |

[a] immediately after preparation of the emulsion
[b] S = stable,
U = unstable,
P = partially stable,
— = completely broken;
all formulations were stable under ambient conditions after mixing with demulsifier - no emulsion breakdown occurred even after several days

TABLE 3

Sandstone core flood results

| Flood Number | 1 | 2 | 3 |
|---|---|---|---|
| Inhibitor Slug | DETAPMP Solution | Emulsion C | Emulsion C |
| Slug Size (PV) | 0.5 | 0.5 | 0.5 |
| Brine $K_{abs}$ (mD) | 562 | 665 | 727 |
| Initial $K_w$ (mD) | 58 | 70 | 72 |
| Initial $S_{or}$ (%) | 35.7 | 36.6 | 33.2 |
| Initial $K_o$ (mD) | 411 | 311 | 451 |
| Initial $S_{wi}$ (%) | 38.4 | 36.8 | 39.0 |
| Post inhibitor $K_o$ (mD) | 420 | 271 | 427 |
| Post inhibitor $S_{wi}$ (%) | 36.7 | 34.6 | 39.7 |
| Final $K_w$ (mD) | 43 | 54 | 61 |
| Final $S_{or}$ (%) | 42.7 | 46.3 | 46.3 |
| Final $K_o$ (mD) | 42.1 | 294 | 436 |
| Final $S_{wi}$ (%) | 36.9 | 29.2 | 37.2 |

$K_{abs}$ = initial brine permeability of the core at the start of the coreflood experiments;
$K_w$ = brine permeability at $S_{or}$;
$K_o$ = oil permeability at $S_{wi}$.

What is claimed is:

1. A method of treating a subterranean formation, the method comprising:

(A) injecting down a well bore into the formation an admixture of (a) an emulsion having an internal aqueous phase comprising a water-soluble oil or gas field chemical or an aqueous dispersion of a water-dispersible oil or gas field chemical and an external oil phase comprising a liquid hydrocarbon and an oil-soluble surfactant and (b) a demulsifier comprising a solution of a surfactant having a cloud point temperature of above 40° C.; or (B) separately injecting down a well bore into the formation emulsion (a) and demulsifier (b) and generating an admixture of emulsion (a) and demulsifier (b) within the formation, wherein the demulsifier comprises at least one surfactant selected from the group consisting of:

(a) polyamine salts such as polyester amines, amino methylated poly acrylamide, poly di-methyl amino propyl methacrylamide, poly dimethyl amino ethyl acrylate, poly ethylene imine, poly vinyl pyrrolidone, caprolactam-based polymers and quaternised version thereof (b) multifunctional polyethers such as sulfated triglycerides;

(c) polyethers, such as copolymers of ethylene oxide and propylene oxide and the reaction products of such copolymers with diacids, diepoxides, diisocyanates, aldehydes, and diamines; and (d) p-alkylphenol-formaldehyde resins and the ethylene oxide and/or propylene oxide derivatives thereof.

2. A method according to claim 1 wherein the admixture of emulsion and demulsifier is generated within the formation by injecting the emulsion down the well bore prior to injection of the demulsifier.

3. A method according to claim 1 wherein the admixture of emulsion and demulsifier is generated within the formation by injecting the demulsifier down the well bore prior to injection of the emulsion and back producing the demulsifier over the emulsion.

4. A method according to claim 2 wherein a spacer is injected down the well bore between the emulsion and demulsifier.

5. A method according to claim 1 comprising the steps of:
A) preparing an admixture of the emulsion and demulsifier; and
B) injecting the admixture down a well bore into the formation.

6. A method according to claim 5 wherein the time interval between preparation of the admixture and injection of the admixture down the wellbore is less than 5 hours.

7. A method according to claim 1 wherein the water-soluble or water-dispersible oil or gas field chemical is selected from the group consisting of (i) scale inhibitors, (ii) corrosion inhibitors, (iii) inhibitors of asphaltene deposition, (iv) hydrogen sulphide scavengers and (v) hydrate inhibitors.

8. A method according to claim 1 wherein the oil or gas field chemical is dissolved or dispersed in the internal aqueous phase of the emulsion in an amount in the range of from 5 to 30 percent by weight.

9. A method according to claim 1 wherein the oil-soluble surfactant of the emulsion has a hydrophilic/lipophilic balance (HLB) value in the range 4 to 6.

10. A method according to claim 1 wherein the emulsion has droplets of the internal aqueous phase having average diameters of from 0.1 to 10 microns.

11. A method according to claim 1 wherein the internal aqueous phase of the emulsion amounts to from 30 to 60 percent of the total volume of the emulsion.

12. A method according to claim 1 wherein the demulsifier comprises a solution of a surfactant having a cloud point temperature of at least 60° C.

13. A method according to claim 1 wherein the point temperature of the demulsifer is controlled to a value of at least 50° C. less than the formation temperature by a adjusting the concentration of surfactant in the demulsifer.

14. A method according to claim 1 wherein the demulsifier comprises a solution of at least one surfactant dissolved in a solvent selected from the group consisting of monoethylene glycol (MEG), tetraethylene glycol (TEG), butylethylene glycol (BGE), butyldiethylene glycol (BDGE), water, xylene and toluene.

15. A method according to claim 1 wherein the concentration of surfactant in the demulsifier is in the range of from 0.1 to 2 percent by weight.

16. Method of treating an oil or gas well comprising injecting into said oil or gas well an admixture of an emulsion and demulsifier as defined in claim 1.

17. A method of treating a subterranean formation, the method comprising:

(A) injecting down a well bore into the formation an admixture of (a) an emulsion having an internal aqueous phase comprising a water-soluble oil or gas field chemical or an aqueous dispersion of a water-dispersible oil or gas field chemical and an external oil phase comprising a liquid hydrocarbon and an oil-soluble surfactant and (b) a demulsifier comprising a solution of a surfactant having a cloud point temperature of at least 60° C.; or (B) separately injecting down a well bore into the formation emulsion (a) and demulsifier (b) and generating an admixture of emulsion (a) and demulsifier (b) within the formation, wherein the demulsifier comprises at least one surfactant selected from the group consisting of:

(a) polyamine salts such as polyester amines, amino methylated poly acrylamide, poly di-methyl amino propyl methacrylamide, poly dimethyl amino ethyl acrylate, poly ethylene imine, poly vinyl pyrrolidone, caprolactam-based polymers and quaternised versions thereof (b) multifunctional polyethers such as sulfated triglycerides;

(c) polyethers, such as copolymers of ethylene oxide and propylene oxide and the reaction products of such copolymers with diacids, diepoxides, diisocyanates, aldehydes, and diamines; and (d) p-alkylphenol-formaldehyde resins and the ethylene oxide and/or propylene oxide derivatives thereof.

* * * * *